United States Patent [19]

Fulmer et al.

[11] Patent Number: 6,055,798
[45] Date of Patent: May 2, 2000

[54] LOCKING MECHANISM FOR A ROTATABLE SHAFT

[75] Inventors: Timothy K. Fulmer, Dixon; Robert Kenneth Byrd, Polo, both of Ill.

[73] Assignee: WEC Company, Oregon, Ill.

[21] Appl. No.: 09/139,627

[22] Filed: Aug. 24, 1998

[51] Int. Cl.[7] .................................................. A01D 34/82
[52] U.S. Cl. ............................... 56/12.7; 56/255; 56/295; 56/DIG. 17; 403/344
[58] Field of Search .................................. 403/344, 256, 403/257; 56/255, 295, 17.5, 12.1, 12.7, DIG. 17, DIG. 20, DIG. 9, DIG. 16

[56] References Cited

U.S. PATENT DOCUMENTS

| | | | |
|---|---|---|---|
| 902,187 | 10/1908 | Warrenfeltz . | |
| 3,588,152 | 6/1971 | Shomo | 287/52.03 |
| 3,670,413 | 6/1972 | Weber | 30/276 |
| 3,781,991 | 1/1974 | Stretton et al. | 30/276 |
| 3,826,068 | 7/1974 | Ballas et al. | 56/12.7 |
| 3,918,241 | 11/1975 | Stillions | 56/12.7 |
| 4,099,369 | 7/1978 | Oosterling et al. | 56/314 |
| 4,428,185 | 1/1984 | Toillie et al. | 56/295 |
| 4,616,949 | 10/1986 | Kellner | 403/104 |
| 4,619,545 | 10/1986 | Kuttenbaum | 403/169 |
| 4,996,828 | 3/1991 | Jetzinger | 56/12.7 |
| 5,056,304 | 10/1991 | Jacobsen | 56/251 |
| 5,109,656 | 5/1992 | Zimmer | 56/17.5 |
| 5,491,962 | 2/1996 | Sutliff et al. | 56/12.7 |
| 5,618,128 | 4/1997 | Chen | 403/344 |
| 5,619,847 | 4/1997 | Cox, Jr. | 56/255 |
| 5,622,035 | 4/1997 | Kondo et al. | 56/12.7 |
| 5,640,836 | 6/1997 | Lingerfelt | 56/255 |
| 5,761,891 | 9/1995 | Ferrari | 56/6 |
| 5,845,468 | 6/1997 | Richardson et al. | 56/6 |
| 5,941,653 | 5/1996 | Cipriani | 403/344 |

OTHER PUBLICATIONS

60–4 & M60–4 Main Frame Assembly Common Parts—May 1991.
60–4 & M60–4 Gearbox Assembly—Dec. 1987.

Primary Examiner—Robert Pezzuto
Assistant Examiner—Arpad Fabian Kovacs
Attorney, Agent, or Firm—Jefferson Perkins; Foley & Lardner

[57] ABSTRACT

A cutter blade is pivotally attached to a blade carrier so that it may operate as a flail. The blade carrier itself rotates about a drive shaft spaced from the pivot axis. A pivot pin is received in respective bores of the cutter blade and the blade carrier; a distal, protruding portion of the pivot pin is threaded. A pair of clamping collar halves each have a threaded surface which threadedly engage the threaded portion of the pivot pin shaft. After the correct amount of axial play between the cutter blade and the carrier is adjusted by rotating the collar halves on the shaft threads, the collar halves are clamped together on the pivot shaft using fasteners so as to affix the clamping collar halves to the shaft.

5 Claims, 5 Drawing Sheets

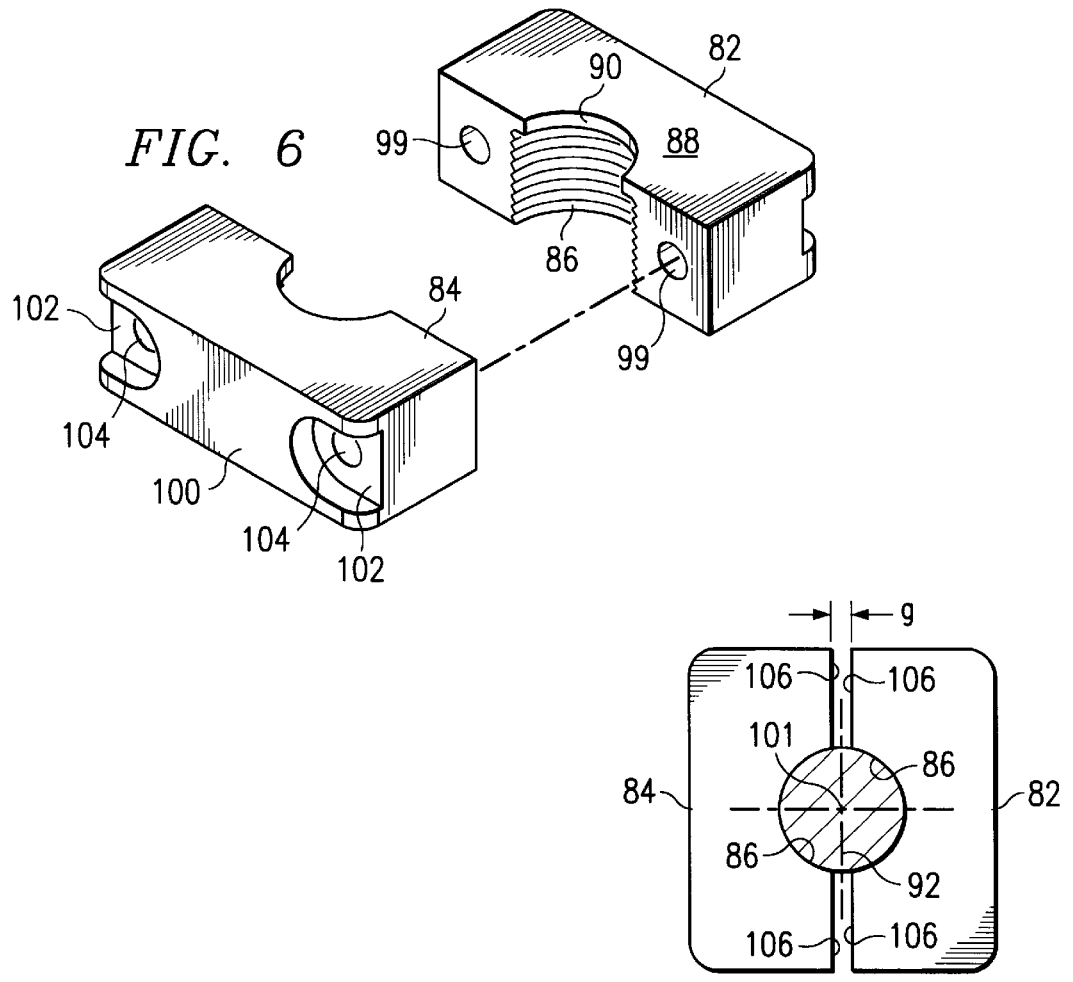
FIG. 6
FIG. 7
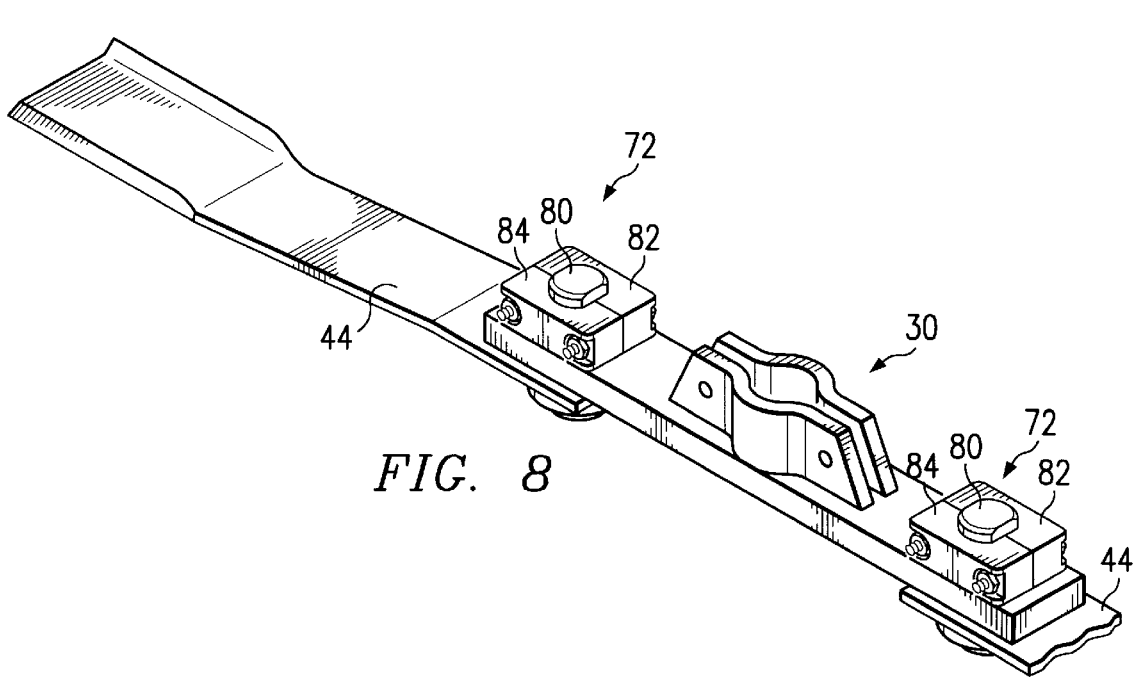
FIG. 8

ID# LOCKING MECHANISM FOR A
ROTATABLE SHAFT

TECHNICAL FIELD OF THE INVENTION

This invention relates in general to fastening two articulating members, and more particularly to a fastening pin for fastening a cutter blade to a crossbar member in a rotary cutter.

BACKGROUND OF THE INVENTION

Many pieces of lawn and garden, groundskeeping and agricultural equipment have rotating cutting blades for shearing vegetable matter. This class of equipment may be termed "rotary cutters." The simplest rotary cutter design is found in the common lawn mower, in which a double blade is affixed to a rotating central shaft. In many larger pieces of equipment, the blade is not directly connected to the rotating central shaft but instead to a horizontal crossbar which in turn is connected to the central shaft. One end of each of two or more blades is pivotally affixed to the crossbar, while an opposed end of each of these blades is permitted to swing free. In normal operation of the rotary cutter, the free end is thrown outward by "centrifugal" force. But when the blade encounters an obstacle that resists being displaced or sheared, such as a rock or other solid object, a free end of the blade will pivot back around the pin, and then resume a straight-out position through "centrifugal" force after the obstacle is cleared.

While such blades are designed to freely articulate in a plane orthogonal to the pin axis, such as a horizontal plane, it is undesirable for such blades to have more than a minimum of play in a direction parallel to the pin axis (e.g. the vertical direction). A swinging blade that has too much vertical play will begin to score the deck or cover of the cutter apparatus, dulling the blade and even perforating the deck plate.

As a result contacting nonvegetable matter, the blades and cutting devices invariably get damaged and become loose on the mechanical shaft or mechanism responsible for their rotation. Moreover, as a result of ordinary use, it is not uncommon for parts of rotary cutters to corrode and for their blades or cutting devices to become dull and require sharpening and cleaning.

When rotary cutters require replacement parts, cleaning, tightening or repair, the procedure for doing so is often complicated for the user. As will be explained below, one prior art technique for affixing a cutter blade to another member such a crossbar is to make bores in the cutter blade and the crossbar and to insert a pin in the bores. The pin may be fabricated with a circumferential groove against which a slot in a keyhole plate is slid home. The vertical play between the members is adjusted by the use of shims or spacers between one surface of the crossbar and the keyhole plate; these spacers vary in number and thickness. A blade pin lock clip is bolted onto the crossbar and against the circumferential groove of the pin to hold the entire assembly together. In time, corrosion of the parts will make them difficult to remove.

It is difficult to perform a field adjustment of the right amount of vertical play between the pivoting member and the other member by selecting among a set of spacers, which spacers must be provided and carried separately.

In other prior art designs, a threaded pin is inserted into bores in the blade and blade carrier or crossbar and retained with a hex nut. After some use the blade pin and hex nut corrode, making disassembly very difficult.

A need therefore exists to develop a pivoting blade attachment mechanism that makes installing, adjusting, repairing and cleaning easier for users of rotary cutters of various types.

DESCRIPTION OF BACKGROUND REFERENCES

Blade assemblies for weed trimmers, mowers and rotary cutters are known in the art. U.S. Pat. No. 5,640,836 discloses a blade assembly for weed trimmers. The blade assembly comprises a seamless, one-piece, disk-shaped hub with pivot pins that attach two or more steel blades to the hub. U.S. Pat. No. 4,428,185 discloses a mower, having a plurality of cutter supports which are driven to be rotated. U.S. Pat. No. 3,781,991 discloses a brush cutter having a rotary brush cutter blade with a flat plate shaped to provide a relatively small number of blade portions.

SUMMARY OF THE INVENTION

The invention provides a method and apparatus which obviates the above-noted problems. Bores are made in the crossbar and the pivoting blade, as before, and a pin is inserted through each bore. But at least a portion of the shaft which protrudes beyond the crossbar and blade thicknesses is threaded. To affix the blade to the crossbar such that it may freely pivot, a clamping collar is threaded onto the pin shaft. In the illustrated embodiment, this clamping collar consists of two halves, the opposed inner faces of which bear threads for threading onto the pin shaft.

The clamping collar is threaded onto the pin shaft until a desired amount of play in a direction parallel to the pin shaft is achieved. Then, at least one fastener, such as a capscrew or a nut and a bolt received into respective bores of the clamping collar halves, is tightened, in turn tightening the clamping collar to the pin shaft so that the clamping collar may no longer freely rotate on the pin shaft. This preserves the amount of vertical play which the user has selected.

According to another aspect of the invention, the pin shaft includes a portion distal to the threaded portion which is not threaded but instead has a radially inwardly extending circumferential groove. Each clamping collar portion has a matching radially inwardly extending flange, axially displaced from the threaded portion of its inner face. This flange and groove act as a collar retainer if the collar ever becomes loose, and will retain the blade on the crossbar in all but extreme situations.

According to another aspect of the invention, flats or other wrenching surfaces are provided on the pin head and the clamping collar halves for the easy assembly, disassembly and adjustment of this blade attachment apparatus.

The present invention permits easy field assembly and disassembly of pivoting blades from a crossbar or other support structure. The use of a set of shims or spacers is obviated; as the blade wears in, the collar can simply be loosened, advanced on the threaded pin shaft and retightened. Blade replacement is also facilitated. While the present invention is described in terms of attaching a pivoting blade to a crossbar, it has application in any situation where a pivoting member is attached, at the pivot axis, to a support member, where the amount of play of the pivoting member with respect to the support member in a direction parallel to the pivot axis needs to be controlled.

BRIEF DESCRIPTION OF THE DRAWINGS

Further aspects of the invention and their advantages will be discerned from the following detailed description when taken in conjunction with the drawings, in which like characters number like parts and in which:

FIG. 6 is a further isometric view of the clamping collar halves shown in FIG. 5 taken from another viewpoint;

FIG. 7 is a part-plan, part-sectional view of the collar halves as fitted onto the pin shaft but before tightening;

FIG. 8 is an isometric view of the attachment apparatus of the invention, shown in an assembled condition.

DETAILED DESCRIPTION OF ILLUSTRATED EMBODIMENT

Figure 1:
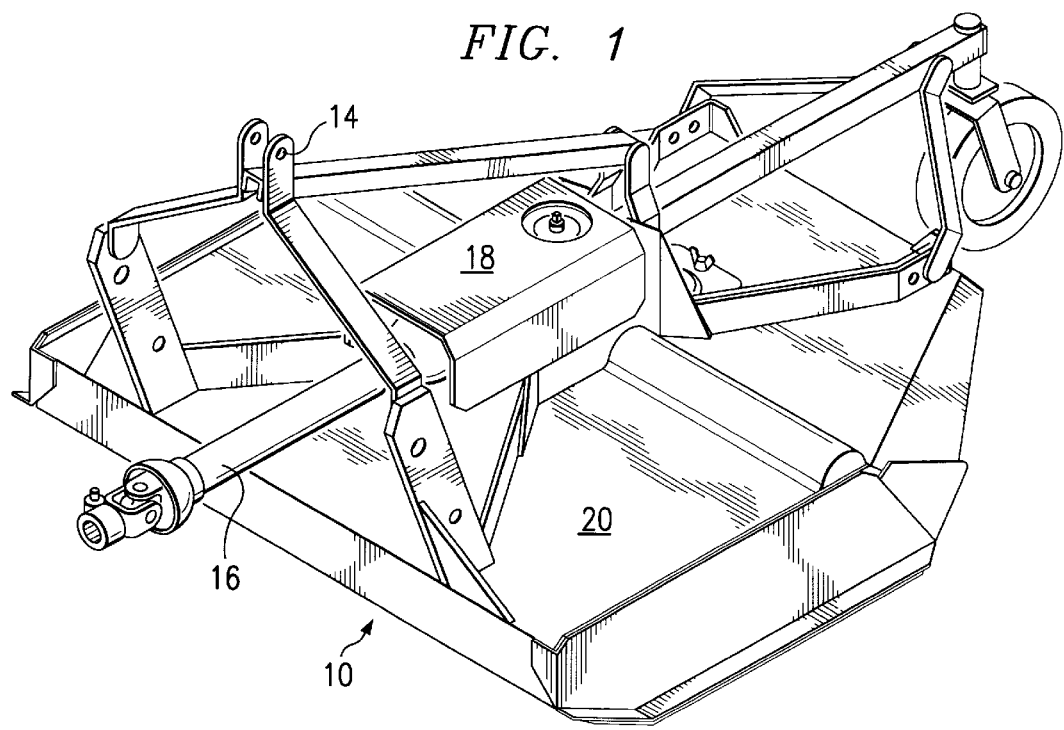
FIG. 1 is an isometric view of a rotary cutter of a type which may employ the invention.

In FIG. 1, a rotary cutter capable of employing the invention is indicated generally at 10. The illustrated cutter 10 is towed behind a tractor (not shown) by the use of a towing hitch 14. Mechanical power is supplied to the cutter 10 by a power takeoff shaft 16, which terminates in a gearbox 18 mounted on top of a cutter deck or shield 20. While the illustrated cutter 10 is of the towed variety, the invention may as easily be employed in a self-propelled cutter or finish mower.

Figure 2:
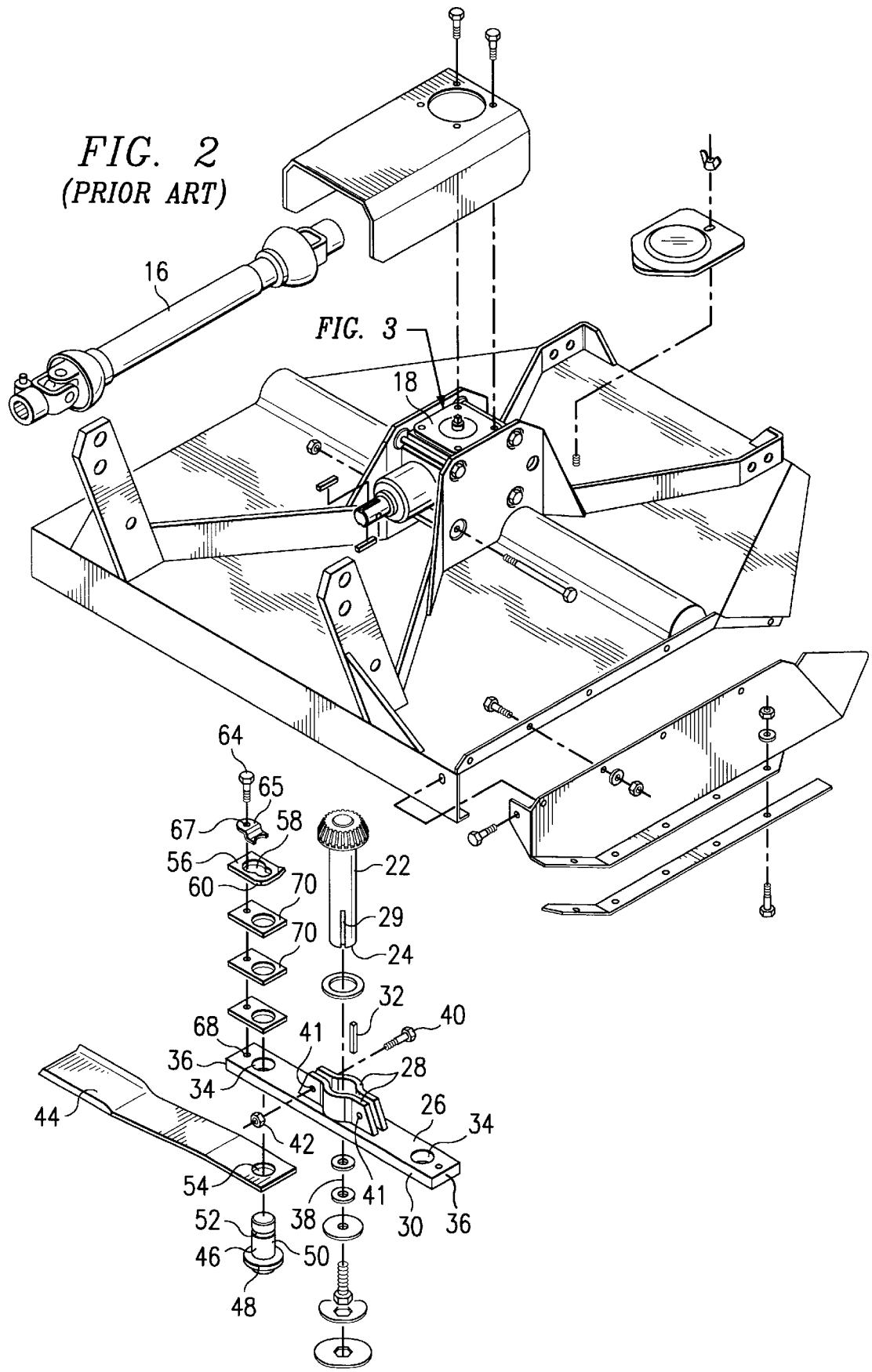
FIG. 2 is an exploded view of the rotary cutter shown in FIG. 1, and further showing a blade attachment mechanism according to the prior art.
Figure 3:
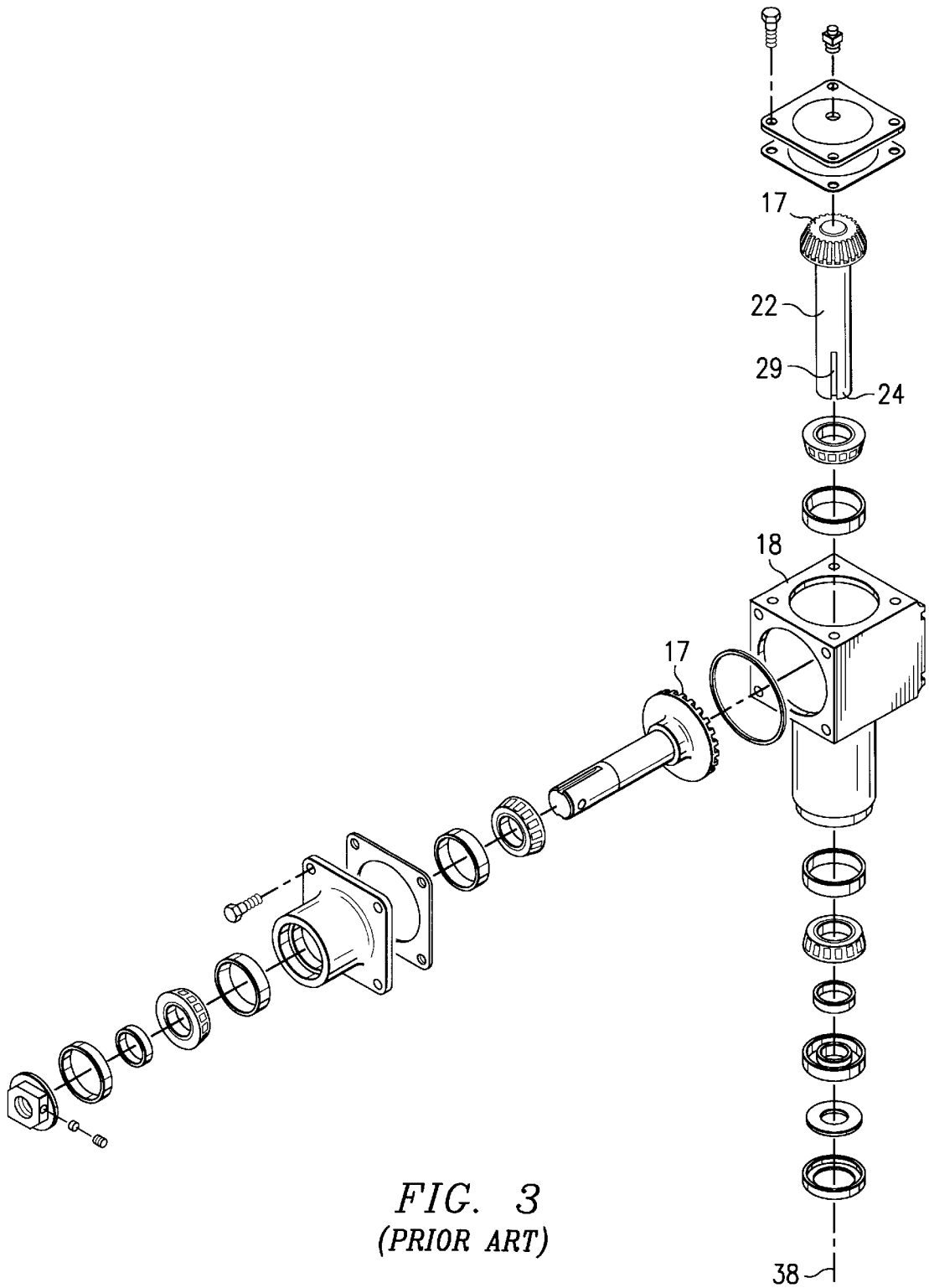
FIG. 3 is a detail of FIG. 2, showing components of a gearbox in exploded view.

Referring next to FIGS. 2 and 3, gears 17 in the gearbox 18 translate power delivered by the power takeoff shaft 16 to a vertical drive shaft 22. A lower end 24 of the drive shaft 22 is affixed to a crossbar or blade carrier 26. The crossbar 26 or support member has a pair of centrally located attachment collars 28 which are affixed as by welding to a horizontal, elongated member 30 at a central location thereon and around a central bore in the crossbar 26. The attachment collars 28 form a receptacle into which shaft end 24 is received. The shaft end 24 is journaled into the collars 28 by means of a key 32, which is partially fit into a respective shaft channel 29. Once the shaft end 24 and key 32 have been inserted between collars 28, the collars 28 are tightened into place around shaft end 24 by suitable fastening means. In the illustrated embodiment, the collars 28 are secured to shaft end 24 by bolts 40, which are inserted into coaxial bores 41 and affixed by nuts 42 (one apiece of bolts 40 and nuts 42 are shown).

The horizontal member 30 of blade carrier 26 takes an elongated shape and is conveniently formed of thick steel plate or bar stock. Member 30 has bores 34 at each of its opposed ends 36. The bores 34 are horizontally spaced from a central rotational shaft axis 38, and in the illustrated embodiment the axes of the bores 34 are parallel to the crossbar or shaft axis 38. The center of each of the bores 34 is on the axis of rotation of a respective blade 44 (one shown).

FIG. 2 illustrates the prior art method of attaching a blade 44 to a crossbar 26 at their mutual axis of articulation. A blade pin 46 has an enlarged head 48 and an elongated shaft 50. A circumferential groove 52 is formed in the shaft 50 at some distance from the head 48. To assemble the blade 44 to the crossbar 26, the pin 46 is inserted into a bore 54 formed in a near end of the blade 44, and then into the bore 34 in the end of the crossbar 26. A keyhole plate 56, which has a large hole 58 and a smaller-diameter lateral extension 60 thereof, is fitted over the small end of the pin 46 and then slid laterally until the inner margin of the hole extension 60 closely engages the innermost surface of the circumferential groove 52. The keyhole plate is then locked into place with a bolt 64 and a retaining clip 65. The bolt 64 is threaded through a bore 67 in the retaining clip 65, through respective bores in the spacer(s) 70, selected by the user to adjust vertical play, and then into a threaded bore 68 formed in the crossbar 26 near a respective pivot bore 34. A concavely curved end of the retaining clip 65 mates with a segment of the inner cylindrical sidewall of the circumferential groove 52 on pin 46, at a place opposite the location where keyhole extension 60 mates with groove 52. The pin 46 is thus laterally captured by a combination of the keyhole extension 60 of the retaining clip 56, which closely fits to half of the angular extent of the circumferential groove, and the concave end of the retaining clip 65, which closely fits to a large portion of the rest.

As described above, the blade 44 should have a small, but not zero, amount of vertical play on the blade pin axis with respect to the crossbar 26. This is to ensure that the blade 44 will swing freely with respect to the crossbar 26 around the pin axis. To adjust this amount of play, according to conventional practice a set of shims or spacers 70 is used, selected ones of which are positioned intermediate the retainer plate 56 and the top surface of the crossbar 26. The shims 70 are selected from a set of shims having different thicknesses so that the right amount of play can be taken up. The pin 46 is inserted into a respective hole in each of the spacers 70 and the bolt 64 is done likewise. The assembler selects different ones and different numbers of the spacers 70 until the right amount of play is obtained.

As the cutter 10 is used, the amount vertical of play between the blade 44 and the crossbar 26 will increase until the play becomes unacceptably large. This requires the user to remove retainer clip 65 and retainer plate 56 and substitute a thicker combination of shims or spacers 70 for the ones originally installed. The keyhole plate 56 and the retainer clip 65 are then reinstalled.

Figure 4:
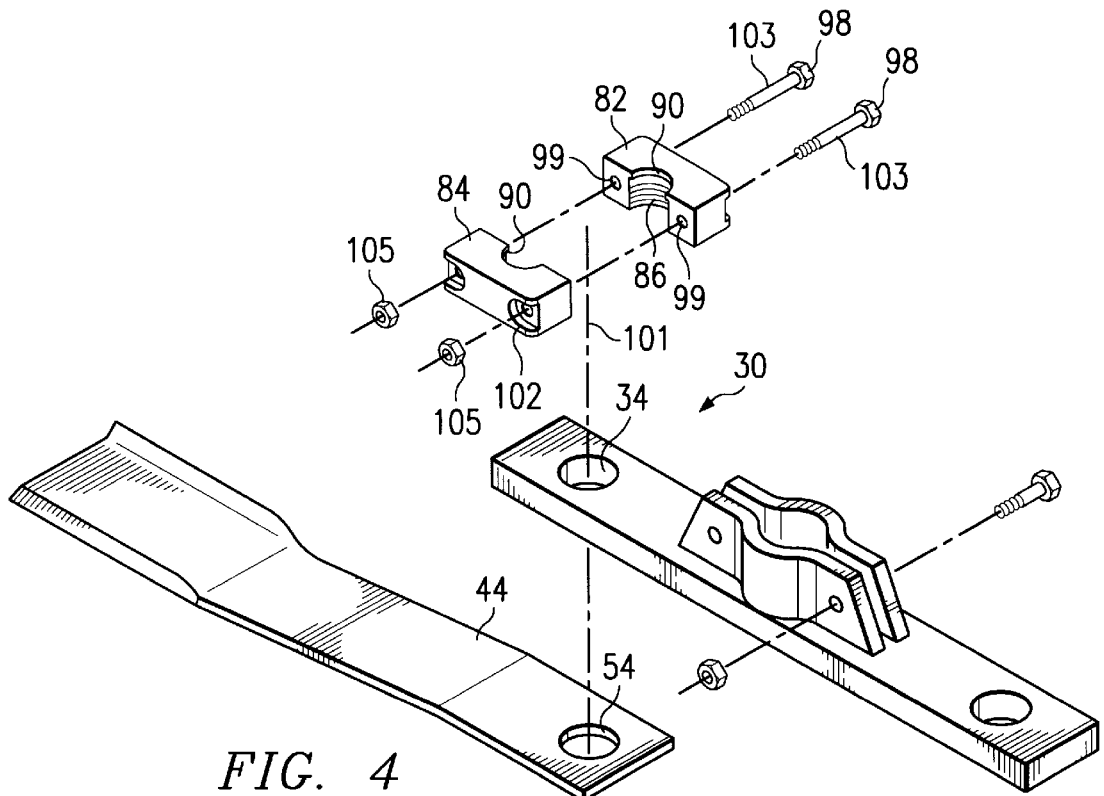
FIG. 4 is an exploded view of a crossbar, blade, pin and threaded clamping collars according to the invention.

FIG. 4 shows a crossbar/blade attachment apparatus according to the invention in exploded view. The smooth-shafted blade pin 46 in FIG. 2 is replaced with a blade pin 72 that has threads 74 along a distal portion 76 of the length of its shaft 92. The shaft further includes a circumferential channel, groove or constriction 78 that is disposed distally of the threaded portion 76 and proximate an end 80 of the pin 72. The constriction 78 is so disposed on the pin shaft that it will not be occluded by the combined thicknesses of the crossbar 26 and the blade 44 once the pin 72 is inserted into bores 34 and 54. A proximal (that is, closer to its head) portion 93 of the shaft 92 is unthreaded, as before. This proximal portion 93 should be less than the combined thicknesses of crossbar member 30 and the blade 44. A head 79 of the pin 72 has flats 81 so that a wrench may apply torque to it; such might be necessary under field conditions to remove the pin 72 after the parts suffer some corrosion, or to readjust for proper freeplay or shim.

Figure 5:
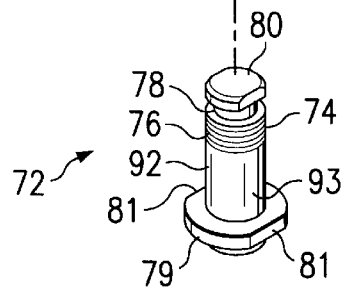
FIG. 5 is an isometric detail of the clamping collar halves according to the invention taken from one angular viewpoint.
Figure 5:
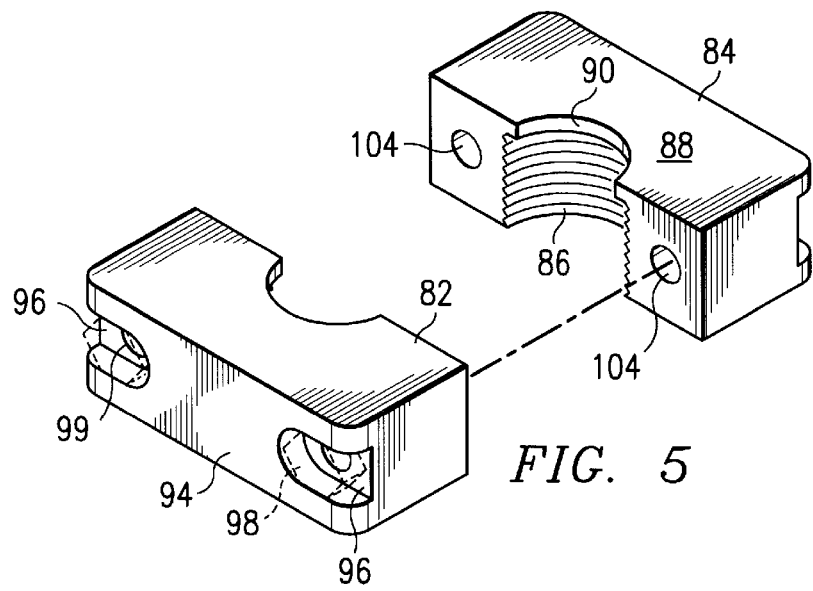

In the place of the spacers, retainer plate and clip shown in FIG. 2, a pair of split collar halves 82 and 84 are provided, best seen in FIGS. 5 and 6. Each of the pin collar halves 82 and 84 has a threaded inner surface 86 which is formed as a cylindrical segment. The threads of the surfaces 86 are meant to engage threaded portion 76 of pin shaft 92 (FIG. 4). At one axial end 88 of each collar half there is an inwardly extending lip or flange 90 that has a substantially semicircular inner circumference. The radius of the margin of the inwardly extending lip 90 is slightly greater than the radius of the external surface of pin channel or groove 78 (FIG. 4), but is less than the general radius of the shaft 92 of blade pin 72. The pin end 80 has a radius which, at its greatest extent, is substantially more than the radius of the inner margin of lips 90.

A back side 94 of the collar half 82 has a pair of U-shaped recesses 96 which have a diameter slightly larger than the diameter between flats of a bolt head 98 (shown in phantom). The recesses 96 are axially centered on respective bores 99, which in turn respectively receive the shafts of the clamping bolts 103 (FIG. 4). The bores 99 are disposed at right angles to the pin axis 101 and pass on opposed sides of the blade pin axis 101; preferably, the bores 99 are parallel to each other. The recesses 96 permit the self-wrenching of bolt heads 98 inside of recess 96 when the nut is tightened onto the bolt. The recesses 96 are deep enough to receive substantially the entire axial thickness of the preferably hexagonal bolt heads 98 to protect the bolt heads from much of the physical punishment that they would otherwise receive.

As best seen in FIG. 6, a back side 100 of the nut-side collar half 84 has formed therein a pair of U-shaped recesses 102 that are centered on respective bores 104. The bores 104 are disposed at right angles to the blade pin axis 101 and pass on either side thereof; preferably, these bores 104 are parallel to each other. The bores 104 are adaptable to be aligned with the bores 99 of the bolt head collar half 82. The recesses 102 are large enough to permit not only a hexagonal nut 105 (FIG. 4), but also, e.g., a box wrench (not shown) for tightening nut 105 onto the shaft of a respective clamping bolt 103. Similar to the recesses 96, the recesses 102 are deep enough to receive substantially the entire thickness of the hex nuts 105, so as to afford them a large measure of protection from debris impacts.

As can be seen in FIG. 7, an inner flat surface 106 of collar half 82 is recessed from a parallel diameter drawn through the blade pin axis 101, such that the surface 86 is a cylindrical segment subtending less than 180 degrees. Similarly, as seen in FIG. 7, the surface 86 of the collar half 84 is formed to include a cylindrical segment that is less than 180 degrees and a pair of inner flat surfaces extending to either side of the cylindrical segment, the flat surfaces disposed in opposition to a respective pair of inner flat surfaces of the collar half 82. Thus, when the two collar halves 82 and 84 are brought together but not yet tightened they occupy substantially less than 360° of the pin shaft circumference, and there is a gap g between them. This allows room for elastic deformation fromclamping force. While in the illustrated embodiment embodiment the collar halves 82 and 84 are substantially equal in angular extent, the present invention comprehends collar components that are substantially unequal, such as one component subtending an arc of a little less than 240° and the other component subtending an arc of a little less than 120°. It is even possible to have more than two collar segments, or only one collar segment formed in the shape of a "c" and having an inner cylindrical surface that subtends less than 360 degrees, together with a pair of radially outwardly extending, opposed flat surfaces defining the gap g between them; in this last embodiment, only one fastener across the "c" gap would be needed.

Because of the compressing, clamping function that the collar halves 82 and 84 perform, it is important that at least one of them be made of a slightly elastic material that will resiliently deform without failure, such as steel.

The illustrated fasteners used to fasten collar halves 82 and 84 together are bolts and nuts, but other fasteners could be used. Functionally, any such fasteners must be able to fasten the collar halves together in each of two conditions. In the first condition, the collar halves are fastened together but may be threadedly moved up and down on the pin shaft. In the second condition, the collar halves are tightly clamped together on the pin shaft such that rotation of them with respect to the pin shaft is not possible. For example, in the place of nuts and bolts, a hinge on one side and a two-position latch on the other could be used.

In operation, and with particular reference to FIGS. 4 and 8, the blade pin 72 is first inserted into a bore in the end of blade 44 and then into the bore 34 of the crossbar member 30. The clamping collar halves 82 and 84 are then loosely bolted together with bolts 103 and nuts 105, such that the retaining lips 90 are engaged in the shaft channel 78 of the blade pin 72 and radially interiorly disposed with respect to the enlarged pin end 80, but not such that the collar halves 82 and 84 are tightened on the pin shaft 92. At this stage, the threaded surfaces 86 of the collar halves 82 and 84 threadedly engage the threaded portion 76 of the pin 72. The collar halves 82 and 84 are either turned clockwise as a unit on pin shaft 92 to advance the collar halves toward the crossbar member 30, or are turned counterclockwise as a unit on pin shaft 92 to draw the collar halves away from the crossbar 30, until the right amount of vertical play between the blade 44 and the horizontal crossbar member 30 is achieved. Then, the bolts 103 and nuts 105 are tightened such that the collar halves are fixed in place on the pin head shaft 92.

As time passes, the blade 44 may become undesirably loose with respect to the crossbar member 30. But this may be easily remedied by loosening bolts 103 and nuts 105, turning the collar halves on the threaded portion of pin shaft 92 until the right amount of play is again achieved, and retightening the collar halves 82 and 84 onto the pin shaft. Advantageously, this adjustment process does not require disassembly of the blade from the crossbar member. In other circumstances, it is desirable to dismount the blades 44 from the crossbar 26, as for sharpening or replacement, and this is also an easier task than is permitted by conventional attachment apparatus.

In certain circumstances, the collar halves may work themselves loose from the pin shaft 92. In these instances, the collar halves will nonetheless be retained on the pin 72, because the inwardly projecting flanges 90 of the collar halves engage the shaft constriction 78, and will not permit the pin end 80 to fall through the bores of the crossbar member 30 and the blade 44. This permits the operator to remedy the looseness problem without having to replace fastening the invention, however, also has application to any plurality of articulating blades as mounted on a spinning blade carrier. More generally, the invention has utility in any situation in which (1) the point of attachment of two or more members to each other is also the point of an axial articulation of those members, and (2) it is important to correctly adjust the play of the articulating members in a direction parallel to the axis of articulation. Therefore, while the present invention has been described in conjunction with rotary cutter blades and mowers, its scope is not so limited. The scope of the invention is instead defined by the claims which follow.

We claim:

1. A rotary cutter head, comprising:

a blade carrier adaptable to spin about a drive shaft axis, at least two ends of the blade carrier being disposed laterally remotely from the drive shaft axis, a bore formed in each of the ends;

means for fixably attaching a rotatable drive shaft to the blade carrier;

for each of the ends of the blade carrier, a cutting blade having a near end and a far end, a hole formed in each near end and adapted to be in registry with a respective blade carrier bore;

for each cutting blade, a blade pin insertable through the hole in the near end thereof, and through a respective bore in an end of the blade carrier, a shaft of the pin having a threaded portion which is not occluded by the respective bore in the blade carrier or the hole in the respective cutting blade when the blade pin is inserted through the hole and bore;

for each blade pin, at least first and second collar segments threadedly engaged with the threaded portion of the pin shaft and abutting less than the entire circumference of the threaded portion of the pin shaft such that there is at least one gap between the first and second collar segments, the collar segments threadedly advanceable in a direction toward the blade carrier and threadedly retractable in a direction away from the blade carrier, such that an amount of play between the blade carrier and the cutting blade in a direction parallel to the pin axis may be adjusted; and at least one fastener joining the first collar segment to the second collar segment across the gap therebetween, the fastener tightenable to affix the collar segments onto the threaded portion of the shaft of the blade pin such that threaded advancement or retraction of the collar segments with respect to the blade carrier is no longer possible.

2. The rotary cutter head of claim 1, wherein the rotary cutter head is mounted on a rotary cutter.

3. The rotary cutter head of claim 2, wherein the rotary cutter is towed.

4. The rotary cutter head of claim 1, wherein each segment of said clamp has two holes at laterally opposite ends, fasteners inserted into the holes to secure the two segments to one another.

5. The rotary cutter head of claim 1, wherein said fastener device is a nut and bolt combination.

* * * * *

UNITED STATES PATENT AND TRADEMARK OFFICE
CERTIFICATE OF CORRECTION

Page 1 of 2

PATENT NO. : 6,055,798

DATED : May 2, 2000

INVENTORS : Timothy K. Fulmer et al.

It is certified that error appears in the above-identified patent and that said Letters Patent is hereby corrected as shown below:

In Column 4, line 13, delete "spacer(s)70" and insert --spacer(s) 70--.

In Column 5, lines 14-15, delete "(shown in phantom) ." and insert --(shown in phantom).--

In Column 5, line 53, delete "fromclamping" and insert --from clamping--.

In Column 5, line 54, delete the second occurrence of "embodiment".

In Column 6, line 53, after "fastening" insert --apparatus lost in the field; it is probable that the operator will sense the increased looseness or blade play before the collar halves become so separated from each other that the pin 72 drops out.

Figure 9:
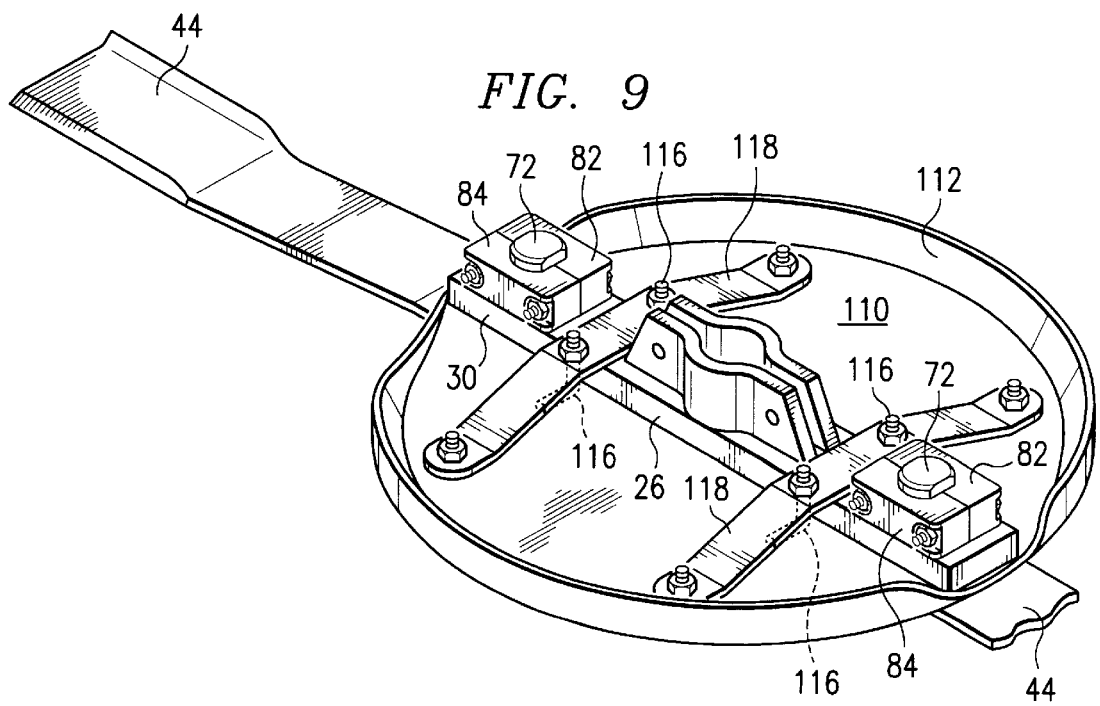
FIG. 9 is a view similar to that shown in FIG. 3, but showing an embodiment which includes a "stump jumper" cutter head attachment.

The embodiment shown in FIGURE 9 is similar to the one described immediately above, except that a "stump jumper" shield 110 has been added over the blade carrier 26. The stump jumper 110 is a large shallow disk having a low sidewall 112. The sidewall 112 is circumferential except at those locations at which blades 44 are mounted; at these locations, a channel or space is formed to permit a respective blade 44 to extend through and to permit the blade 44 some degree of articulation with respect to the blade carrier 26.

The blade pin 72 is assembled through a bore 54 in the blade 44, as before, and then into a bore (not shown) in the bottom, main surface of the stump jumper 110. The pin 72 then passes through the respective pin bore 34 in the blade 44, and is fixed in place by collar halves 82 and 84 as previously described. The stump jumper 110 is affixed to the blade carrier 26 by angle irons 116 (shown partly in phantom) which are welded onto the inner surface of the stump jumper disk. These angle irons 116 are arranged in pairs to closely receive the elongated, rectangular member 30 therebetween. For each pair of angle irons 116 a strap 118 is provided which is placed over the elongated blade carrier member 30 and attached to the angle iron pair and directly to the stump jumper shield as well by means such as nuts, bolts and washers.

UNITED STATES PATENT AND TRADEMARK OFFICE
CERTIFICATE OF CORRECTION

PATENT NO. : 6,055,798
DATED : May 2, 2000
INVENTOR(S) : Timothy K. Fulmer, et al.

It is certified that error appears in the above-identified patent and that said Letters Patent is hereby corrected as shown below:

In summary, a novel method and apparatus for attaching a blade to a blade carrier at an axis of rotation of those two parts has been shown and described. The illustrated embodiment shows a blade carrier carrying only two opposed blades;--

Signed and Sealed this

Twenty-ninth Day of May, 2001

*Attest:*

NICHOLAS P. GODICI

*Attesting Officer*    *Acting Director of the United States Patent and Trademark Office*